United States Patent
Reddy Vennapusa

(10) Patent No.: US 10,635,659 B2
(45) Date of Patent: Apr. 28, 2020

(54) MOBILE APPLICATION BUNDLED WITH METADATA DATABASE

(71) Applicant: salesforce.com, inc., San Francisco, CA (US)

(72) Inventor: Satyaprakash Reddy Vennapusa, Hyderabad (IN)

(73) Assignee: SALESFORCE.COM, INC., San Francisco, CA (US)

( * ) Notice: Subject to any disclaimer, the term of this patent is extended or adjusted under 35 U.S.C. 154(b) by 271 days.

(21) Appl. No.: 15/269,009

(22) Filed: Sep. 19, 2016

(65) Prior Publication Data

US 2018/0083962 A1 Mar. 22, 2018

(51) Int. Cl.

| G06F 21/00 | (2013.01) |
| G06F 16/23 | (2019.01) |
| G06F 16/22 | (2019.01) |
| G06F 16/951 | (2019.01) |
| G06F 16/958 | (2019.01) |
| H04W 12/08 | (2009.01) |

(52) U.S. Cl.
CPC .......... *G06F 16/2379* (2019.01); *G06F 16/22* (2019.01); *G06F 16/951* (2019.01); *G06F 16/958* (2019.01); *H04W 12/08* (2013.01)

(58) Field of Classification Search
CPC .......... H04L 63/0876; G06F 17/30864; G06F 17/3089; G06F 17/30312; G06F 17/30377; G06F 16/2379; G06F 16/22; G06F 16/951; G06F 16/958; H04W 12/08
See application file for complete search history.

(56) References Cited

U.S. PATENT DOCUMENTS

| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |

(Continued)

*Primary Examiner* — Kendall Dolly
(74) *Attorney, Agent, or Firm* — Schwabe Williamson & Wyatt

(57) ABSTRACT

Customization objects stored in a mobile database may be used to customize webpages and applications rendered in, or executed by a mobile application implemented by a mobile device. Upon authenticating the mobile application, a service provider may determine whether any customization objects have been updated since a previous authentication of the mobile application, and may update the mobile database with the updated customization objects. This way, the mobile device does not have to obtain customization objects from remote storage of the service provider each time a webpage is requested thereby reducing signaling overhead and decreasing webpage rendering time.

20 Claims, 6 Drawing Sheets

(56) References Cited

U.S. PATENT DOCUMENTS

| | | |
|---|---|---|
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatteriee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,601,467 B2 * | 12/2013 | Hofhansl .................. G06F 8/60 717/120 |
| 8,646,103 B2 | 2/2014 | Jakobson et al. |
| 10,069,914 B1 * | 9/2018 | Smith .................. H04L 67/1097 |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0162509 A1 * | 7/2008 | Becker ............. G06F 17/30575 |
| 2008/0249972 A1 | 10/2008 | Dillon |
| 2009/0063415 A1 | 3/2009 | Chatfield et al. |

(56) References Cited

U.S. PATENT DOCUMENTS

| | | |
|---|---|---|
| 2009/0100342 A1 | 4/2009 | Jakobson |
| 2009/0177744 A1 | 7/2009 | Marlow et al. |
| 2011/0218958 A1 | 9/2011 | Warshavsky |
| 2011/0247051 A1 | 10/2011 | Bulumulla |
| 2011/0270857 A1* | 11/2011 | Bommireddipalli ........................ G06F 17/30306 707/758 |
| 2012/0042218 A1 | 2/2012 | Cinarkaya |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2014/0359537 A1 | 12/2014 | Jackobson et al. |
| 2015/0046204 A1* | 2/2015 | Sitina .................. G06Q 10/063 705/7.11 |
| 2016/0098265 A1* | 4/2016 | Mahajan .................. G06F 8/43 717/170 |
| 2016/0321021 A1* | 11/2016 | Derut ...................... G06F 9/451 |

* cited by examiner

MOBILE APPLICATION BUNDLED WITH METADATA DATABASE

MOBILE APPLICATION BUNDLED WITH METADATA DATABASE COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate generally to driving customer service interactions on social media.

BACKGROUND

Applications that are tailored to run on mobile devices (e.g., smartphones, tablet personal computers (PCs), and the like) usually include a container in which an application specific website or collection of webpages may be rendered or displayed. These mobile applications may be customized for a user or organization using metadata. The metadata is typically stored in a metadata database (DB) associated with the user or organization, which is typically located in a remote storage facility of a cloud computing service, an enterprise information technology service, customer relationship management system, and/or other like service providers. In order to render a webpage in the mobile application container, the mobile application requests and downloads associated metadata along with other data each time a webpage is requested. Constantly requesting metadata for rendering in the mobile application container each time a webpage is requested increases signaling overhead and may delay rendering of the requested page thereby increasing user frustration.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

Figure 1A:
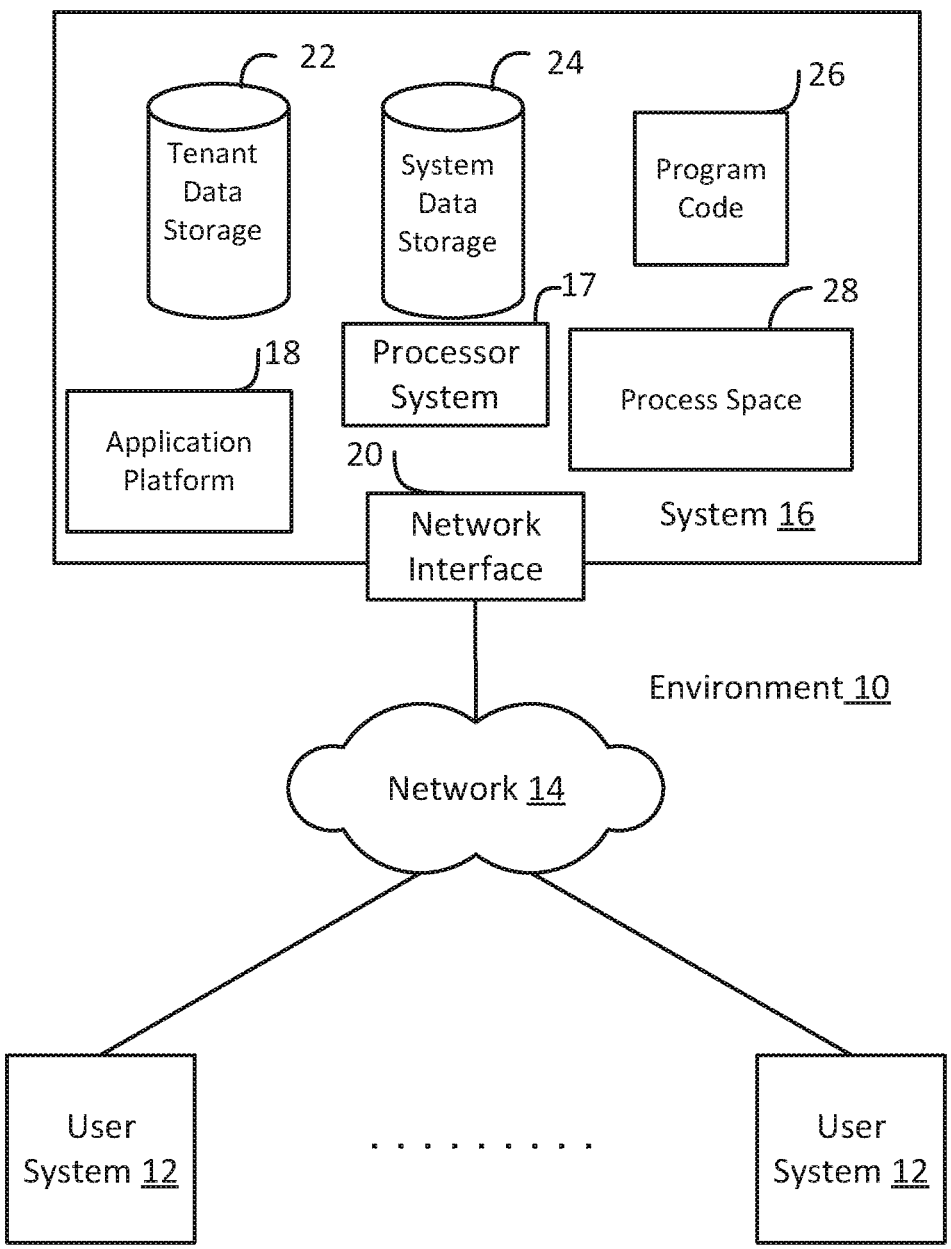
FIG. 1A shows a block diagram of an example environment in which an on-demand database service can be used according to some implementations.

Today mobile applications download metadata along with other data on the fly and construct views, render webpages; and/or the like. Example embodiments presented herein reduce the amount of metadata downloads thereby improving page loading times and reducing signaling overhead. As an example, a plurality of organizations (e.g., companies, etc.) may utilize a mobile application provided by a service provider (e.g., a cloud computing service, an enterprise social networking service, a customer relationship management service, etc.) to deliver their own applications and services to their clients (e.g., customers). Each organization may have a large set of customizations for the mobile application that allows them to deliver their applications/services to their clients. These organizations may also have customizations that allow their agents (e.g., salespersons, employees, customer service representatives, etc.) to utilize the mobile application to deliver the organization's applications/services.

Instead of providing a same version of the mobile application for each organization and each organization's agents, example embodiments provide a way to build a customized version of the mobile application bundled with its own metadata database (DB) (also referred to as a "mobile database," "mobile DB," and the like). The mobile DB may store all required customizations for a particular organization and/or for that organization's clients or agents. The metadata used to customize the mobile application may be referred to as "customization objects."

In various embodiments, when a mobile device uses the mobile application to log into the service provider's system, instead of requesting customization objects from a remote storage associated with an organization (e.g., by making calls to simple object access protocol (SOAP) and/or representational state transfer (REST) application programming interfaces (APIs) for metadata), the mobile application may obtain customization objects from the mobile DB. The mobile application may then use the obtained customization objects for implementing customizations of the mobile application that are unique to that organization. For example, the customizations may include rendering a webpage in the mobile application in a customized manner, executing organization-specific applications, and/or the like.

In various embodiments, upon logging in, the service provider's system may determine if there have been any changes to customization objects associated with the mobile application and/or organization since the last time the mobile device used the mobile application to log in. If there is a change to the customization objects, then the service provider's system may synchronize its own metadata DB with the mobile DB in one direction. In this way, the mobile DB may include the updated customization objects. In embodiments, the synchronization may occur on a page-by-page basis, wherein only updated customization objects associated with a requested webpage or content is provided to the mobile DB through the mobile application.

The example embodiments may provide the following advantages: example embodiments reduce signaling and network calls made from mobile applications to server-side applications thereby reducing overhead costs; example embodiments improve page loading performance drastically since obtaining data from local storage is typically faster than obtaining data using over the air interfaces; and the mobile DB of the example embodiments may be provided as an add-on feature, and thus, may be easily deployed with already existing mobile applications and service provider infrastructure.

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Some implementations described and referenced herein are directed to systems, apparatus, computer-implemented methods and computer-readable storage media for identifying articles helpful in resolving user queries.

A database system might display a case associated with a customer support query. The database system may initiate a search for other cases related to the new case. The database system may extract relevant terms from the title and/or description provided in the new case using a term weighting algorithm, such as more like this (MLT). The relevant terms are then used in a search query for identifying the related cases.

The database system identifies articles linked to the related cases, ranks the articles, and causes the articles to be displayed on a remote user system in an order based on the ranking. The database system may rank the articles based on a number of related cases linked to the articles. The database system also may rank the article based on other parameters, such as relevancy scores for the related cases, labels assigned to the cases, last modified dates of the related cases, etc.

The database system may identify more relevant articles by first finding related cases that use a similar vocabulary to describe similar customer problems. The database system then identifies the articles that were previously determined to help resolve the prior problems. Thus, the database system may bridge the gap between vocabularies used by customers to describe problems and vocabularies used in articles to describe solutions to those problems.

In some implementations, the users described herein are users (or "members") of an interactive online "enterprise social network," also referred to herein as an "enterprise social networking system," an "enterprise collaborative network," or more simply as an "enterprise network." Such online enterprise networks are increasingly becoming a common way to facilitate communication among people, any of whom can be recognized as enterprise users. One example of an online enterprise social network is Chatter®, provided by salesforce.com, inc. of San Francisco, Calif. salesforce.com, inc. is a provider of enterprise social networking services, customer relationship management (CRM) services and other database management services, any of which can be accessed and used in conjunction with the techniques disclosed herein in some implementations. These various services can be provided in a cloud computing environment as described herein, for example, in the context of a multi-tenant database system. Some of the described techniques or processes can be implemented without having to install software locally, that is, on computing devices of users interacting with services available through the cloud. While the disclosed implementations may be described with reference to Chatter® and more generally to enterprise social networking, those of ordinary skill in the art should understand that the disclosed techniques are neither limited to Chatter® nor to any other services and systems provided by salesforce.com, inc. and can be implemented in the context of various other database systems such as cloud-based systems that are not part of a multi-tenant database system or which do not provide enterprise social networking services.

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Apple's Safari, Google's Chrome, Opera's browser, or Mozilla's Firefox browser, or the like, allowing a user (for example, a subscriber of on-demand services provided by the system 16) of the user system 12 to access, process and view information, pages and applications available to it from the system 16 over the network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 1B:
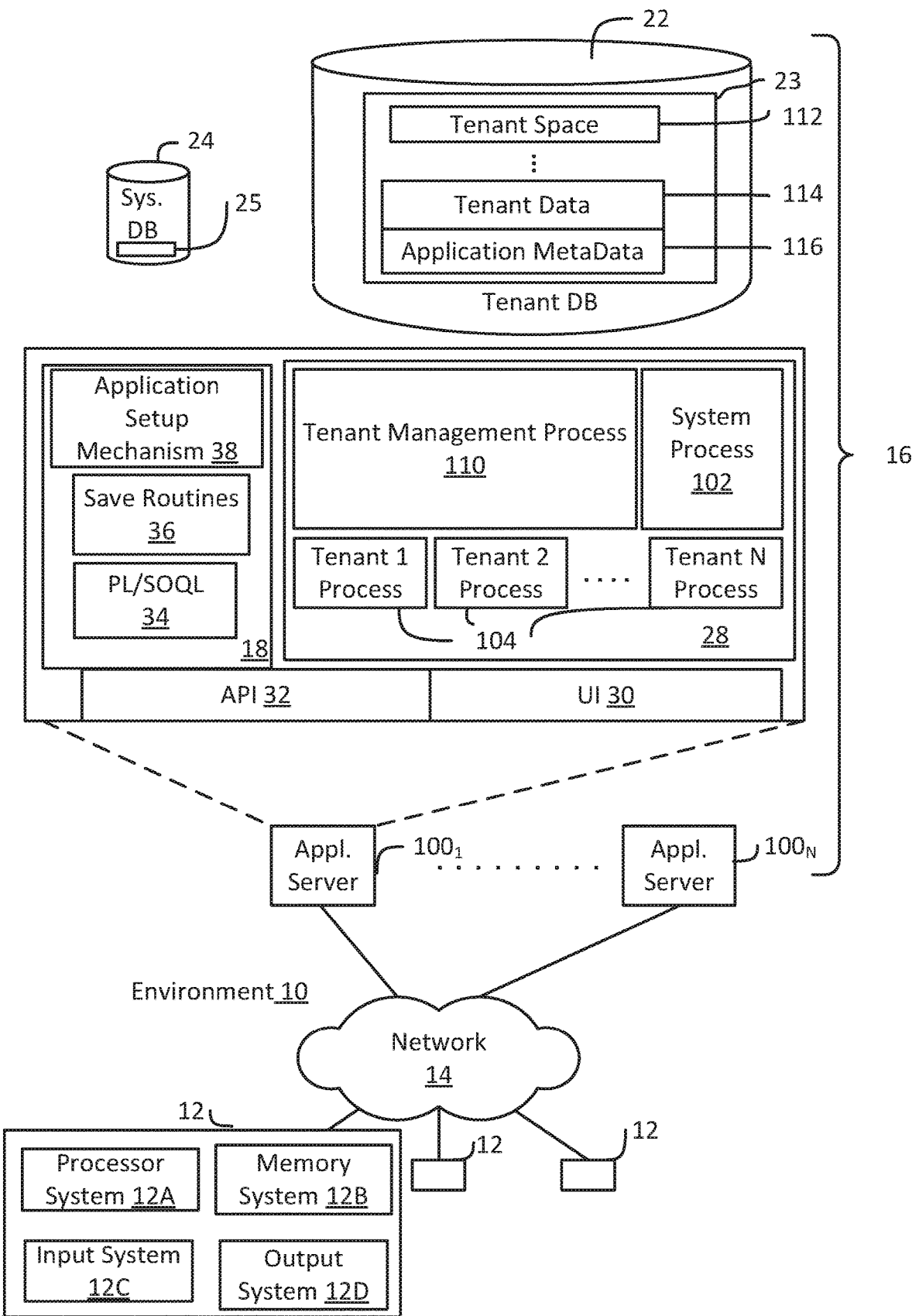
FIG. 1B shows a block diagram of example implementations of elements of FIG. 1A and example interconnections between these elements according to some implementations.

FIG. 1B shows a block diagram of example implementations of elements of FIG. 1A and example interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, the network interface 20 is implemented as a set of HTTP application servers $100_1$-$100_N$. Each application server 100, also referred to herein as an "app server", is configured to communicate with tenant database 22 and the tenant data 23 therein, as well as system database 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space 110. The application platform 18 includes an application setup mechanism 38 that supports application developers' creation and management of applications. Such applications and others can be saved as metadata into tenant database 22 by save routines 36 for execution by subscribers as one or more tenant process spaces 104 managed by tenant management process 110, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection. For example, one application server $100_1$ can be coupled via the network 14 (for example, the Internet), another application server $100_{N-1}$ can be coupled via a direct network link, and another application server $100_N$ can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 2:
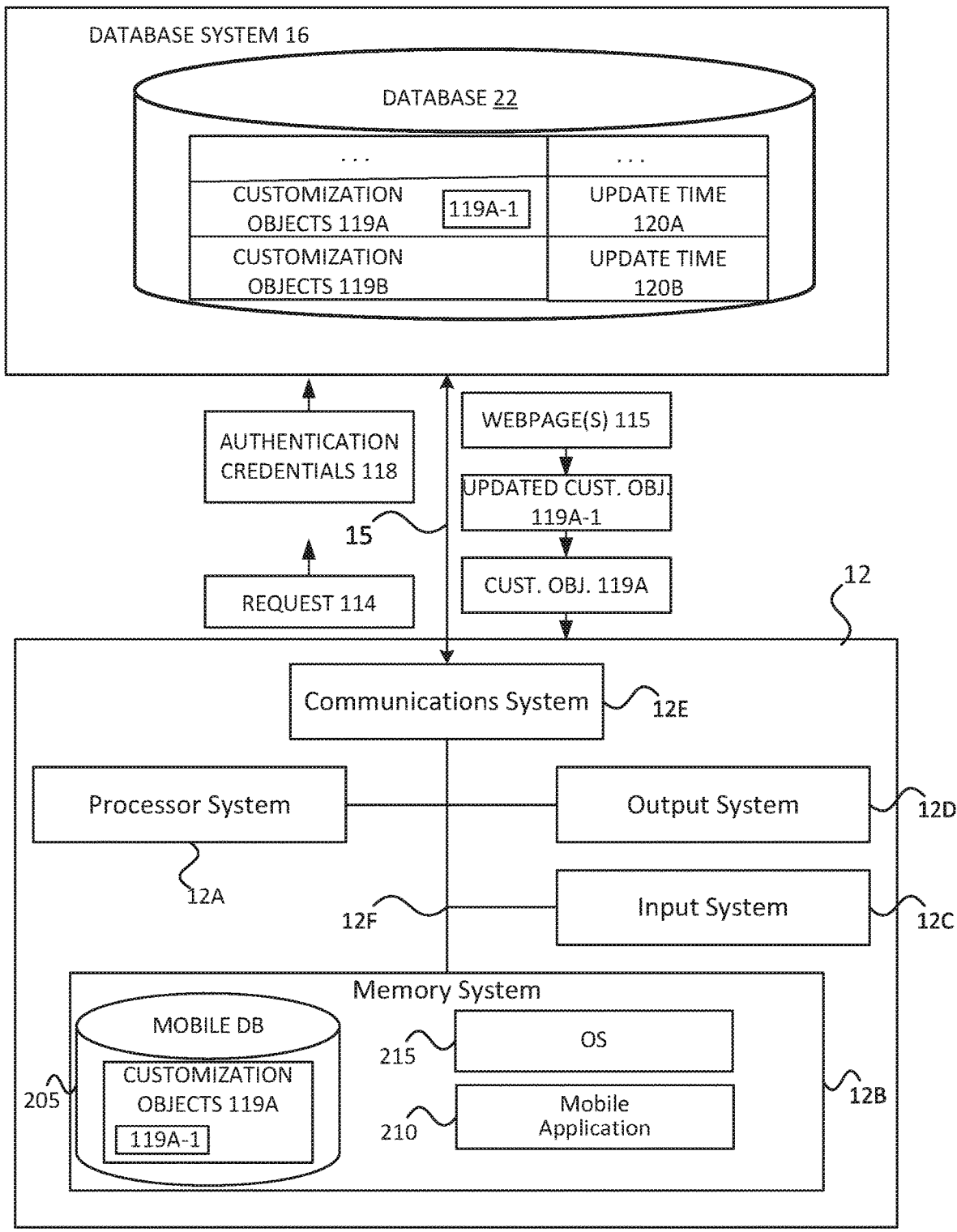
FIG. 2 shows the components of a user system in relation to elements of a database system, in accordance with various example embodiments.

FIG. 2 shows the components of a user system 12 in relation to elements of the database system 16, in accordance with various example embodiments. In addition to the processor system 12A, the memory system 12B, the input system 12C, and the output system 12D discussed previously, the user system 12 may also include a communications system 12E. The components of user system 12 may be coupled with each other by bus 12F at least as shown by FIG. 2.

During operation, memory system 12B may include operating system (OS) 215, mobile DB 205, and mobile application 210. OS 215 may manage computer hardware and software resources, and provide common services for applications of the user system 12. OS 215 may include one or more drivers and/or APIs that provide an interface to hardware devices thereby enabling OS 215 and mobile application 210 to access hardware functions without needing to know the details of the hardware itself. In some embodiments, the OS 215 may include middleware that may connect two or more separate applications or connect applications with underlying hardware components beyond those available from OS 215 and/or the drivers/APIs. The OS 215 may be a general purpose operating system or an operating system specifically written for and tailored to the user system 12.

The mobile application 210 may be a software application designed to run on the user system 12 when the user system 12 is implemented in a mobile device, such as a smartphone, tablet computer, and the like. Program code and/or software modules of the mobile application 210 may be executed by the processor system 12A. The mobile application 210 may be a native application, a web application, or a hybrid application. Native applications may be used for operating the user system 12 (e.g., accessing and/or utilizing one or more sensors of the user system 12 and other like functions of the user system 12), may be platform or OS specific. Native applications may be pre-installed in memory system 12B during manufacturing, or provided to the memory system 12B by a vendor or service provider (e.g., an owner/operator of database system 16 including a cloud computing service, an enterprise information technology service, a CRM system, and/or the like) via network 14 and communications system 12E using over-the-air (OTA) interfaces. In embodiments where the mobile application 210 is implemented as a native application, the mobile application 210 may include a container for rendering application-specific webpages.

Web applications are applications that load into a web browser of the user system 12 in response to requesting the web application from a service provider (e.g., a web server that may be associated with database system 16). Web applications may be websites that are designed or customized to run on a mobile device by taking into account various mobile device parameters, such as resource availability, display size, touchscreen input, and the like. In this way, web applications may provide an experience that is similar to a native application within a web browser. Web applications may be any server-side application that is developed with any server-side development tools and/or programming languages, such as PHP, Node.js, ASP.NET, and/or any other like technology that renders Hypertext Markup Language (HTML).

Hybrid applications may be a hybrid between native applications and web applications. Hybrid applications may be a standalone skeleton or other like application container that may load a website within the application container. Hybrid applications may be written using website development tools and/or programming languages, such as HTML5, Cascading Stylesheets (CSS), JavaScript, and the like. Hybrid applications use a browser engine of the user system 12, without using a web browser of the user system 12, to render a website's services locally. Hybrid applications may also access mobile device capabilities that are not accessible in web applications, such as the one or more sensors, local storage, and the like.

Regardless of whether the mobile application 210 is implemented as a native application, web application, or hybrid application, the processor system 12A implementing the mobile application 210 may be capable of requesting, obtaining, and rendering webpages in an application container or browser. In various embodiments, the mobile application 210 may be capable of rendering a customized version of such webpages using data stored in the mobile DB 205, and/or executing tasks or other applications based on the data stored in the mobile DB 205. Furthermore, mobile application 210 may be capable of executing tasks or applications based on instructions received from database system 16, such as updating the mobile DB 205 with updated versions of customization objects 119.

In various embodiments, the owner/operator of database system 16 may have pre-built the mobile application 210 for use by agents of an organization, and a user of the user system 12 may be an agent of the organization. In this regard, the owner/operator of database system 16 may provide the ability for the organization (e.g., application developers, software engineers, etc.) to customize the mobile application 210 to implement custom functionality unique to the needs/demands of the organization. In some embodiments, the owner/operator of database system 16 may provide SOAP, REST, and/or metadata APIs to allow the organization to create or update customization objects 119 for customizing the mobile application 210.

The mobile DB 205 may be a collection of data used to customize the mobile application 210. Each individual data item used to customize the mobile application 210 may be referred to as a "customization object." The customization objects 119 may be objects that store data unique to a specific user and/or organization, or the customization objects 119 may be external objects that map to data stored outside of the database system 16. Additionally, customization objects 119 may be used to extend the functionality of standard non-customizable objects. The customizations to the mobile application 210 may include rendering a webpage in a container of the mobile application 210 in a customized manner; creation and implementation of custom fields, links, objects, page layouts, buttons, record types, tabs, etc.; hosting or embedding a separate native application, hybrid application, web application, media (locally or remotely stored), files (locally or remotely stored), etc. in the container of the mobile application 210; executing organization-specific tasks/applications (locally or remotely stored); and/or other like customizations.

In embodiments, the customization objects stored in mobile DB 205 may be the same or substantially mirror the customization objects 119 allocated to a user of user system 12 and/or an organization associated with mobile application 210. For example, referring to FIG. 2, customization objects 119A may be associated with the user of the user system 12 and/or the organization associated with mobile application 210, whereas the customization objects 119B may be associated with another user system 12 and/or another organization. In some embodiments, customization objects 119 may be the same or similar as the application metadata 116 stored in tenant DB 22 discussed previously with regard to FIGS. 1A and 1B.

When a user of the user system 12 uses the mobile application 210 to log into the database system 16 to access an associated tenant space, the user system 12 may obtain a copy of the customization objects 119A for storage in the mobile DB 205. To this end, the user system 12 using the communications system 12E may establish a link 15 (also referred to as "channel 15," 'networking layer tunnel 15," and the like) with the database system 16 to provide authentication credentials 118 to the database system 16 and to obtain the copy of the customization objects 119A. Once the customization objects 119A are received over the link 15, the communications system 12E may provide the customization objects 119A to the mobile application 210 for storage in the mobile DB 205.

Furthermore, in various embodiments, when user system 12 is authenticated by the database system 16, the database system 16 may identify updated customization objects 119A-1 in metadata DB 22 and provide the updated customization objects to the mobile application 210 for storage in the mobile DB 205. To identify the updated customization objects 119A-1, the database system 16 may query the metadata DB 22 to obtain an update time 120A of each customization object 119A. The update time may be an entry in the metadata DB 22 that indicates a time and/or date when each of the customization objects 119A were last edited and stored in the metadata DB 22 (for example, by a developer of the organization). Similarly, the update time 120B may indicate a time and/or date when each of the customization objects 119B were last edited and stored in the metadata DB 22 (for example, by a developer of the other organization). The database system 16 may determine the updated customization objects 119A-1 to be ones of the customization objects 119A that have an update time 120A that is later than a previous login attempt by the user system 12 and/or later than a time of a previous authentication of the user system 12.

When the customization objects 119A and the updated customization objects 119A-1 are obtained by the user system 12, the user system 12 may use one or more applications or APIs that enable querying of the mobile DB 205 and/or storage of customization objects in the mobile DB 205. Any suitable querying language may be used to query and store information in mobile DB 205, such as structured query language (SQL), object query language (OQL), Salesforce® OQL (SOQL), Salesforce® object search language (SOSL), and/or other like query languages.

In addition, when the user system 12 is authenticated by the database system 16, the database system 22 may provide one or more webpages 115 to the user system 12. The webpages 115 may be provided with the customization objects 119A and/or updated customization objects 119A-1. For example, after the user system 12 is authenticated, the database system 16 may provide a home page, which may be one of the webpages 115, with the customization objects 119A. By way of another example, after the user system 12 is authenticated the user system 12 may send a request 114 for a webpage 115 to the database system 16 over the link 15. In response to the request 114, the database system 16 may obtain the updated customization objects 119A-1 associated with the requested webpage 115, and provide the updated customization objects 119A-1 with the requested webpage 115. In some embodiments, the webpages 115 may be provided subsequent to the customization objects 119A and/or updated customization objects 119A-1. For example, in response to the request 114, the database system 16 may obtain the updated customization objects 119A-1 associated with the requested webpage 115, and provide the updated customization objects 119A-1 to the user system 12 and subsequently provide the requested webpage 115.

Bus 12F may be configured to enable the communication and data transfer between processor system 12A and memory system 12B. Bus 12F may comprise a high-speed serial bus, parallel bus, internal universal serial bus (USB), Front-Side-Bus (FSB), a PCI bus, a PCI-Express (PCI-e) bus, a Small Computer System Interface (SCSI) bus, an SCSI parallel interface (SPI) bus, an Inter-Integrated Circuit (I2C) bus, a universal asynchronous receiver/transmitter (UART) bus, and/or any other suitable communication technology for transferring data between components within user system 12.

Communications system 12E may include circuitry for communicating with a wireless network and/or cellular network. Communications system 12E may be used to establish the networking layer tunnel 15 through which the user system 12 may communicate with the database system 16. Communications system 12E may include one or more processors (e.g., baseband processors, etc.) that are dedicated to a particular wireless communication protocol (e.g., Wi-Fi and/or IEEE 802.11 protocols), a cellular communication protocol (e.g., Long Term Evolution (LTE) and the like), and/or a wireless personal area network (WPAN) protocol (e.g., IEEE 802.15.4-802.15.5 protocols including ZigBee, WirelessHART, 6LoWPAN, etc.; or Bluetooth or Bluetooth low energy (BLE) and the like). The communications system 12E may also include hardware devices that enable communication with wireless networks and/or other user systems 12 using modulated electromagnetic radiation through a non-solid medium. Such hardware devices may include switches, filters, amplifiers, antenna elements, and the like to facilitate the communication OTA by generating or otherwise producing radio waves to transmit data to one or more other devices via the one or more antenna elements, and converting received signals from a modulated radio wave into usable information, such as digital data, which may be provided to one or more other components of user system 12 via bus 12F.

Although FIG. 2 illustrates various components of user system 12, in some embodiments, user system 12 may include many more components than those shown in FIG. 2. For example, in some embodiments, the user system 12 may include a display module (as part of the output system 12D, for example), an input/output (I/O) interface (as part of the input system 12C, for example), a power management integrated circuit (PMIC), network interface controller, one or more sensors (e.g., an image sensor or camera, one or more biometric sensors, gyroscope sensors, accelerometers, gravimeters, compass/magnetometers, altimeters, barometers, proximity sensors, ambient light sensors, thermal sensors, ultrasonic transceivers, and/or positioning circuitry such a Global Positioning System (GPS)) modules, nd/or other like components). However, it is not necessary to show and describe such components to illustrate the example embodiments.

Figure 3:
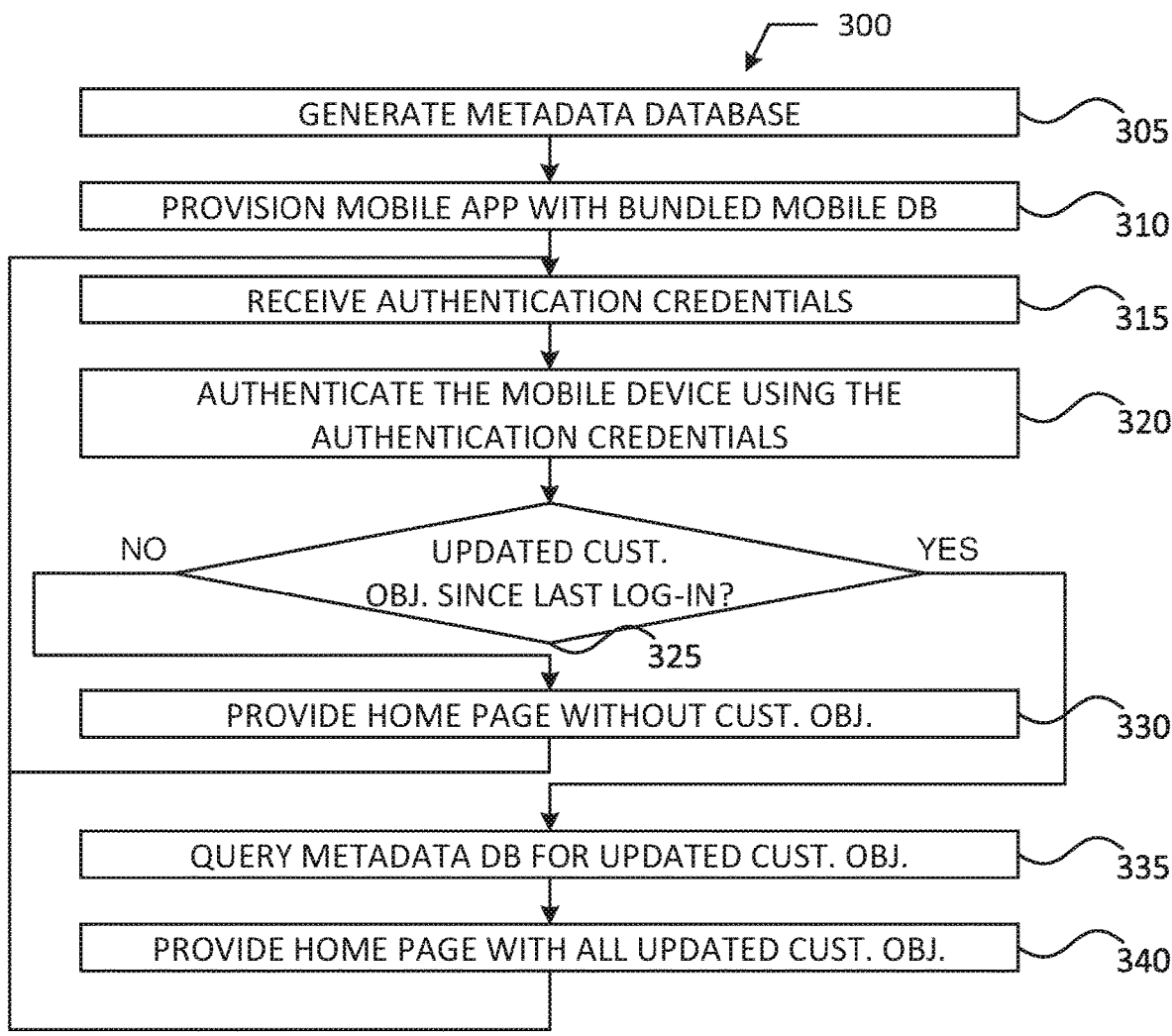
FIG. 3 illustrates a process for providing customization objects to a mobile device, in accordance with various example embodiments.

FIG. 3 illustrates a process 300 for providing customization objects to a mobile device, in accordance with various example embodiments. For illustrative purposes, the operations of process 300 will be described as being performed by database system 16 discussed with regard to FIGS. 1A, 1B, and 2. However, it should be noted that other computing devices may operate the process 300 in a multitude of implementations, arrangements, and/or environments. In some embodiments, process 300 may be implemented by one or more other processes of the system 16, such as tenant management process 110 and/or a tenant management process 104 described previously. In addition, while particular examples and orders of operations are illustrated in FIG. 3, in various embodiments, these operations may be re-ordered, separated into additional operations, combined, or omitted altogether.

Referring to FIGS. 2 and 3, at operation 305, the database system 16 may generate a metadata DB 22 to be associated with a particular mobile device (e.g., user system 12) or an organization that is associated with a plurality of mobile devices that utilize a customizable mobile application 210 on behalf of the organization. In embodiments, the metadata DB 22 may be stored in or associated with a tenant space 112 of a mobile device or organization within tenant DB 22. At operation 310, the database system 16 may provision a mobile application 210 ("mobile app.") with a bundled mobile DB 205 in the user system 12. In embodiments, the mobile DB 205 may include the same customization objects 119A that are stored in the metadata DB 22. In some embodiments, operation 310 may occur when a user of user system 12 downloads and installs the mobile application 210. In embodiments where the user system 12 already includes the mobile application 210, at operation 310 the database system 16 may provision the mobile DB 205 by instructing the user system 12 to store the mobile DB 205 in association with the mobile application 210.

At operation 315, the database system 16 may receive authentication credentials 118 from the user system 12, and at operation 320 the system 16 may authenticate the user system 12 using the authentication credentials 118. At operation 325, the database system 16 may determine whether any customization objects ("cust. obj.") 119A have been updated since a last time the user system 12 logged into the database system 16. As an example, the metadata DB 22 may store an update time 120A indicating a time and date that customization objects 119A have been edited and stored in the metadata DB 22. Further, in some embodiments, the database system 16 may log a time/date of each user authentication and may query the metadata DB 22 (e.g., using any of the aforementioned querying languages) to determine whether any of the customization objects 119A were edited and stored in the metadata DB 22 at a later time than the last authentication of the user system 12. Other procedures or processes may be used to determine whether the customization objects have been updated.

If at operation 325 the database system 16 determines that no customization objects 119A have been updated since the last time the user system 12 logged into the database system 16, then the database system 16 may proceed to operation 330 to provide a home page (e.g., a webpage 115) to the user system 12 without any customization objects 119A. In embodiments, the user database system 16 may obtain customization objects 119A associated with the home page 115 from the mobile DB 205 and render the home page 115 accordingly. After providing the home page 115 to the user system 12, the database system 16 may proceed back to operation 315 to obtain authentication credentials 118 of the user system 12 at a next login.

If at operation 325 the database system 16 determines that one or more customization objects 119A have been updated since the last time the user system 12 logged into the database system 16, then the database system 16 may proceed to operation 335 to query the metadata DB 22 for updated customization objects 119A-1. At operation 340, the system 16 may provide the home page to the user system 12 with all of the updated customization objects 119A-1 that were obtained from the metadata DB 22, which may be used to render the home page and other subsequently requested webpages 115. In embodiments, the database system 16 may also send an instruction to the user system 12 indicating how and when the user system 12 should store the updated customization objects 119A-1. For example, in some embodiments, the system 16 may instruct the user system 12 to store the updated customization objects 119A-1 upon receipt of the updated customization objects 119A-1, while in other embodiments the system 16 may instruct the user system 12 to store the updated customization objects 119A-1 upon or after display of the home page 115.

In embodiments, the user system 12 may obtain non-updated customization objects 119A associated with the home page and/or subsequently requested webpages 115 from the mobile DB 205 and render the webpages 115 using both the updated customization objects 119A-1 and the non-updated customization objects 119A. After providing the home page and all of the updated customization objects to the user system 12, the database system 16 may proceed back to operation 315 to obtain authentication credentials 118 of the user system 12 at a next login. The process 300 may repeat as necessary or end.

Figure 4:
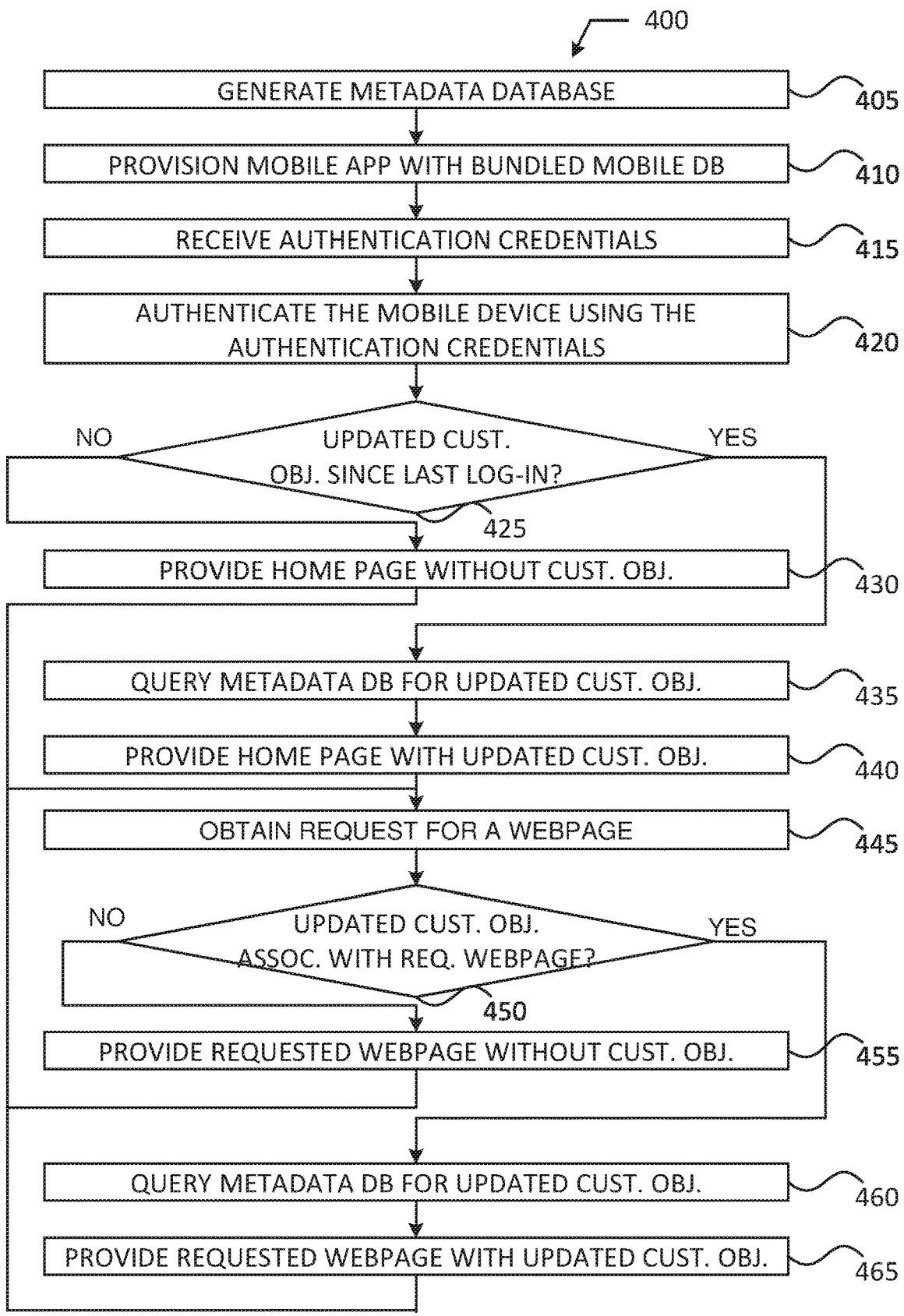
FIG. 4 illustrates another process for providing customization objects to a mobile device, in accordance with various example embodiments.

FIG. 4 illustrates another process 400 for providing customization objects to a mobile device, in accordance with various example embodiments. For illustrative purposes, the operations of process 400 will be described as being performed by database system 16 discussed with regard to FIGS. 1A, 1B, and 2. However, it should be noted that other computing devices may operate the process 400 in a multitude of implementations, arrangements, and/or environments. In some embodiments, process 300 may be implemented by one or more other processes of the system 16, such as tenant management process 110 and/or a tenant management process 104 described previously. In addition, while particular examples and orders of operations are illustrated in FIG. 4, in various embodiments, these operations may be re-ordered, separated into additional operations, combined, or omitted altogether.

Referring to FIGS. 2 and 4, at operation 405, the database system 16 may generate a metadata DB 22 to be associated with a particular mobile device (e.g., user system 12) or an organization that is associated with a plurality of mobile devices that utilize a customizable mobile application 210 on behalf of the organization. Operation 405 may be the same or similar to operation 305 discussed with regard to FIG. 3. At operation 410, the database system 16 may provision a mobile application 210 with a bundled mobile DB 205 in the user system 12. Operation 410 may be the same or similar to operation 310 discussed with regard to FIG. 3.

At operation 415, the database system 16 may receive authentication credentials 118 from the user system 12, and at operation 420 the database system 16 may authenticate the user system 12 using the authentication credentials 118. At operation 425, the database system 16 may determine whether customization objects 119A associated with a home page 115 have been updated since a last time the user system 12 logged into the database system 16. Operations 415, 420, and 425 may be the same or similar to operations 315, 320, and 325, respectively, discussed with regard to FIG. 3.

If at operation 425 the database system 16 determines that no customization objects 119A associated with the home page 115 have been updated since the last time the user system 12 logged into the database system 16, then the database system 16 may proceed to operation 430 to provide the home page 115 to the user system 12 without any customization objects 119A. In embodiments, the user system 12 may obtain non-updated customization objects 119A associated with the home page 115 from the mobile DB 205 and render the home page 115 using those customization objects 119A.

If at operation 425 the database system 16 determines that one or more customization objects 119A of the home page 115 have been updated since the last time the user system 12 logged into the database system 16, then the database system 16 may proceed to operation 435 to query the metadata DB 22 for updated customization objects 119A-1. At operation 440, the database system 16 may provide the home page 115 to the user system 12 with the updated customization objects 119A-1 that were obtained from the metadata DB 22. In embodiments, the database system 16 may also send an instruction to the user system 12 indicating how and when the user system 12 should store the updated customization objects 119A-1 associated with the home page 115. For example, in some embodiments, the database system 16 may instruct the user system 12 to store the updated customization objects 119A-1 upon receipt of the updated customization objects 119A-1 associated with the home page 11, while in other embodiments the database system 16 may instruct the user system 12 to store the updated customization objects 119A-1 upon or after display of the home page 115. In embodiments, the user system 12 may obtain non-updated customization objects 119A associated with the home page 115 from the mobile DB 205 and render the home page 115 using both the updated customization objects 119A-1 and the non-updated customization objects 119A. After providing the home page and updated customization objects to the user system 12, the database system 16 may proceed to operation 445 to obtain a request 114 for a webpage 115.

At operation 445, the database system 16 may obtain a request 114 for a webpage 115 from mobile application 210, and at operation 450, the database system 16 may determine whether any customization objects 119A associated with the requested webpage have been updated since a previous time that the user system 12 requested the webpage 115. Operation 450 may be performed in a same or similar manner as discussed previously with regard to operation 425. If at operation 450 the database system 16 determines that no customization objects 119A have been updated since the previous time that the user system 12 requested that particular webpage 115, then the database system 16 may proceed to operation 455 to provide the requested webpage 115 to the user system 12 without any customization objects 119A. After providing the requested webpage 115 to the user system 12, the database system 16 may proceed back to operation 445 to obtain another request 114 for another webpage 115.

If at operation 450 the database system 16 determines that one or more customization objects 119A have been updated since the previous time that the user system 12 requested the webpage 115, then the database system 16 may proceed to operation 460 to query the metadata DB 22 for the updated customization objects 119A-1 associated with the requested webpage 115. At operation 460, the database system 16 may provide the requested webpage 115 to the user system 12 with the updated customization objects 119A-1 that were obtained from the metadata DB 22 at operation 460. In embodiments, the database system 16 may also send an instruction to the user system 12 indicating how and when the user system 12 should store the updated customization objects 119A-1 associated with the requested webpage 115. For example, in some embodiments, the database system 16 may instruct the user system 12 to store the updated customization objects 119A-1 upon receipt of the updated customization objects 119A-1 associated with the requested webpage 115, while in other embodiments the database system 16 may instruct the user system 12 to store the updated customization objects 119A-1 upon or after display of the requested webpage 115. After providing the requested webpage 115 and updated customization objects 119A-1 to the user system 12, the database system 16 may proceed back to operation 445 to obtain another request 114 for another webpage 115. The process 400 may repeat as necessary or end.

Figure 5:
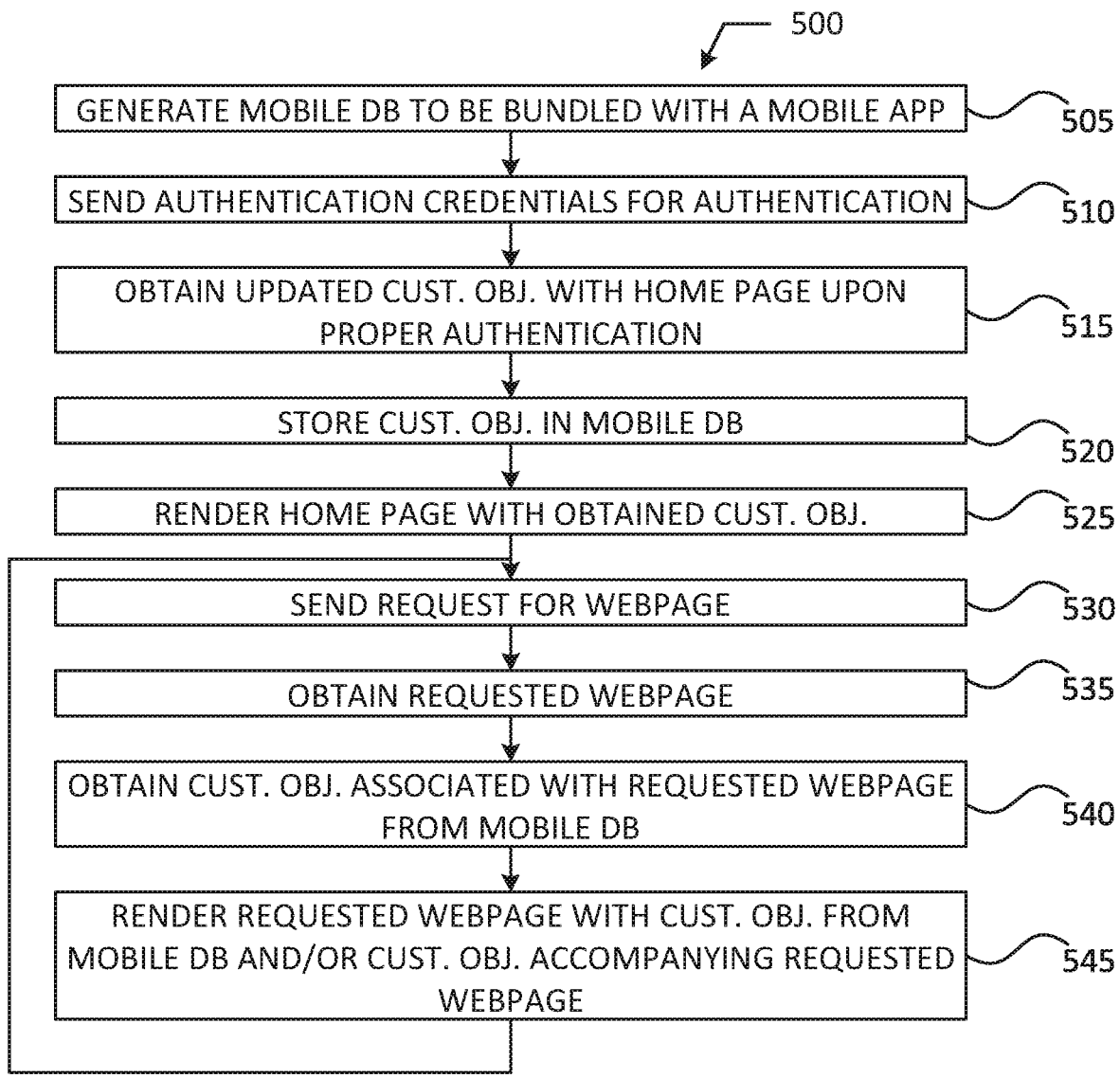
FIG. 5 illustrates a process for obtaining and rendering customization objects, in accordance with various example embodiments.

FIG. 5 illustrates a process 500 for obtaining and rendering customization objects, in accordance with various example embodiments. For illustrative purposes, the operations of process 500 will be described as being performed by user system 12 discussed with regard to FIGS. 1A, 1B, and 2. However, it should be noted that other computing devices may operate the process 500 in a multitude of implementations, arrangements, and/or environments. In addition, while particular examples and orders of operations are illustrated in FIG. 5, in various embodiments, these operations may be re-ordered, separated into additional operations, combined, or omitted altogether.

Referring to FIGS. 2 and 5, at operation 505, the user system 12 may generate a mobile DB 205 to be bundled with a mobile application 210. In some embodiments, the mobile application 210 may have been previously installed in the memory system 12B. In other embodiments, the user system 12 may generate the mobile DB 205 during an installation process for the mobile application 210.

At operation 510, the user system 12 may send authentication credentials 118 to the database system 16 for authentication of the user system 12. The authentication credentials 118 may include a user name, password, biometric data, a digital certificate associated with the user system 12, or any other suitable personal identification information associated with the user of the user system 12. The user system 12 may obtain at least some of the authentication credentials 118 via the input system 12C, which may be input into a login page that is rendered upon initialization of the mobile application 210. Some of the authentication credentials (e.g., the digital certificate) may be stored in memory system 12B, which may be provided to the database system 16 upon establishment of the link 15, for example. At operation 515, the user system 12 may obtain updated customization objects 119A-1, if any, with a home page 115 upon proper authentication of the user system 12, and at operation 520 the user system 12 may store the obtained updated customization objects 119A-1 in the mobile DB 205. In some embodiments, the user system 12 may store the updated customization objects 119A-1 upon receipt of the updated customization objects 119A-1, while in other embodiments the user system 12 may store the updated customization objects 119A-1 upon or after display of the home page 115 (e.g., at or after operation 525).

At operation 525, the user system 12 may render the home page 115 with the obtained updated customization objects 119A-1. In embodiments, the user system 12 may obtain non-updated customization objects 119A associated with the home page 115 from the mobile DB 205 and render the home page 115 using both the updated customization objects 119A-1 and the non-updated customization objects 119A.

At operation 530, the user system 12 may send a request 114 for a webpage to the database system 16, and at operation 535, the user system 12 may obtain the requested webpage 115 from the database system 16. In embodiments, if there are any updated customization objects 119A-1 associated with the requested webpage 115, the user system 12 may obtain the updated customization objects 119A-1 with or subsequent to obtaining the requested webpage 115.

At operation 540, the user system 12 may obtain customization objects 119A associated with the requested webpage 115 from the mobile DB 205 using, for example, the previously mentioned querying languages. At operation 545, the user system 12 may render the requested webpage 115 with updated customization objects 119A-1 obtained with the requested webpage 115 and/or customization objects 119A obtained from the mobile DB 205. The requested webpage 115 may be rendered in a container of the mobile application 210. In some embodiments, the user system 12 may store the updated customization objects 119A-1 upon receipt of the updated customization objects 119A-1 (e.g., prior to rendering the requested webpage 115), while in other embodiments the user system 12 may store the updated customization objects 119A-1 upon or after display of the requested webpage 115 (e.g., at or after operation 545). Once the requested webpage 115 is rendered, the user system 12 may proceed back to operation 430 to send another request 114 for another webpage 115. The process 500 may repeat as necessary or end.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices.

Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A computer program stored by one or more non-transitory computer-readable media and executable by a processor system of a service provider system, the computer program for providing customization objects to customize a mobile application, the computer program comprising a set of instructions, and in response to execution of the instructions by the processor system, the computer program is operable to:
   store, in a metadata database, a plurality of customization objects for customization of the mobile application implemented by a mobile device, the metadata database being stored in a storage system of the service provider system;
   authenticate a user of the mobile device;
   identify, in response to proper authentication of the user of the mobile device, one or more updated customization objects from the plurality of customization objects, the one or more updated customization objects being customization objects that have been updated prior to the authentication of the user of the mobile device and after a previous authentication of the user of the mobile device; and
   provide, in response to identification of the one or more updated customization objects, the identified one or more updated customization objects to the mobile device for storage in a mobile database, the mobile database being stored in a memory system local to the mobile device.

2. The computer program of claim 1, wherein to identify the updated customization objects, the set of instructions is operable to:
   query the metadata database to obtain an update time of each customization object, the update time being a time that the plurality of customization objects were edited and stored in the metadata database; and
   determine the one or more updated customization objects to be ones of the plurality of customization objects having an update time that is later than a time of a previous authentication of the mobile device.

3. The computer program of claim 1, wherein to provide the updated customization objects to the mobile device, the set of instructions is operable to:
   send the one or more updated customization objects to the mobile device upon proper authentication of the mobile device.

4. The computer program of claim 1, wherein to provide the one or more updated customization objects to the mobile device, the set of instructions is operable to:
   send, to the mobile device, ones of the one or more updated customization objects associated with a home page upon proper authentication of the mobile device; and subsequently send, to the mobile device, ones of the one or more updated customization objects associated with a requested webpage upon receipt of a request for the requested webpage.

5. The computer program of claim 1, wherein the set of instructions is further operable to:
   instruct the mobile device to store the one or more updated customization objects upon receipt of the one or more updated customization objects or upon display of a website associated with the one or more updated customization objects.

6. The computer program of claim 1, wherein the set of instructions is further operable to:
   obtain, from the mobile application via the mobile device, a request for a webpage to be rendered in the mobile application;
   determine, in response to the request, whether any of the one or more updated customization objects are associated with the requested webpage; and
   send, to the mobile application via the mobile device, the requested webpage and ones of the one or more updated customization objects associated with the requested webpage.

7. The computer program of claim 6, wherein the set of instructions is operable to:
   obtain, from the mobile application via the mobile device, another request for another webpage to be rendered in the mobile application;
   determine, in response to the other request, that none of the one or more updated customization objects are associated with the other webpage; and
   send, to the mobile device, the other webpage without any of the one or more updated customization objects.

8. The computer program of claim 1, wherein the set of instructions is operable to:
   instruct the mobile device to store the mobile database in association with the mobile application when the mobile application is already installed in the mobile device; and
   instruct the mobile device to install the mobile application with the mobile database when the mobile device does not already include the mobile application.

9. A computer program stored by one or more non-transitory computer-readable media and executable by a processor system of a mobile device, the computer program for obtaining customization objects for customization of a mobile application that is implemented by the mobile device, the computer program comprising a set of instructions, and in response to execution of the instructions, the computer program is operable to:
   send, to a service provider system, authentication information to authenticate a user of the mobile device to use the mobile application and/or to access a platform via the mobile application;
   obtain, in response to proper authentication, one or more updated customization objects with source code for generating and rendering the mobile application, the one or more updated customization objects having been updated subsequent to a previous authentication of the user of the mobile device and prior to sending the authentication information, the one or more updated customization objects being non-local versions of a plurality of customization objects that are stored in a metadata database of the service provider system;
   store the one or more updated customization objects in a mobile database associated with the mobile application in a local memory system of the mobile device, the mobile database to store local versions of a plurality of customization objects for customization of the mobile application implemented by the mobile device;
   obtain, from the mobile database in the local memory system, one or more non-updated customization objects; and
   generate and render the mobile application in an application container using the one or more updated customization objects and the one or more non-updated customization objects.

10. The computer program of claim 9, wherein, to obtain the one or more updated customization objects, the set of instructions is operable to:
    obtain, from the service provider system upon proper authentication, all of the one or more updated customization objects and a home page to be rendered in a container of the mobile application;
    subsequent to storage of the one or more updated customization objects in the mobile database, obtain, from the mobile database, customization objects associated with the home page; and
    render the home page in the container according to customization objects associated with the home page.

11. The computer program of claim 10, wherein the set of instructions is operable to:
    send, to the service provider system, a request for a webpage to be rendered in the mobile application;
    obtain, in response to the request, the requested webpage;
    obtain customization objects associated with the requested webpage from the mobile database, the customization objects associated with the requested webpage including at least one of the one or more updated customization objects; and
    render the requested webpage in the container according to customization objects associated with the requested webpage.

12. The computer program of claim 9, wherein the set of instructions is operable to:
    obtain, from the service provider system upon proper authentication, a home page for rendering in a container of the mobile application with ones of the one or more updated customization objects associated with the home page;
    obtain, from the mobile database, non-updated customization objects associated with the home page; and
    render the home page in the container according to the non-updated customization objects associated with the home page and the ones of the one or more updated customization objects associated with the home page.

13. The computer program of claim 12, wherein the set of instructions is operable to:
    send, to a database system, a request for a webpage to be rendered in the mobile application;
    obtain, in response to the request, the requested webpage and ones of the one or more updated customization objects that are associated with the requested webpage;
    obtain non-updated customization objects associated with the requested webpage from the mobile database; and
    render the home page in the container according to the non-updated customization objects associated with the requested webpage and the ones of the one or more updated customization objects associated with the requested webpage.

14. An apparatus to be employed as a service provider system, the apparatus comprising:

a processor system coupled with a memory system, the processor system and memory system are configurable to:

generate a metadata database to be stored in a database system implemented by the service provider system, the metadata database to store a plurality of customization objects for customization of a mobile application implemented by a mobile device;

authenticate the mobile device upon receipt of a request message including from the mobile device via the mobile application, the request message including authentication credentials to authenticate a user of the mobile device;

identify, in response to proper authentication of the mobile device, updated customization objects from the plurality of customization objects that have been updated prior to the authentication of the user of the mobile device and after a previous authentication of the user of the mobile device; and generate, in response to identification of the one or more updated customization objects, a response message to include the updated customization objects for storage in a mobile database implemented locally by the mobile device; and a network interface communicatively coupled with the processor system, the network interface to: receive the request message from the mobile device; and transmit the response message to the mobile device.

15. The apparatus of claim 14, wherein to identify the updated customization objects, the processor system is to:

query the metadata database to obtain an update time of each customization object, the update time being a time that the plurality of customization objects were previously edited and stored in the metadata database; and determine the updated customization objects to be ones of the plurality of customization objects having an update time that is later than a time of a previous authentication of the mobile device.

16. The apparatus of claim 14, wherein:

the processor system is to generate individual response messages based on corresponding request messages obtained from the mobile device, the individual response messages to include one or more of the updated customization objects to be sent to the mobile device; and the network interface is to receive the corresponding request messages from the mobile device and transmit the individual response messages to the mobile device.

17. The apparatus of claim 14, wherein the response message is a first response message, and the processor system is to:

generate the first response message to include ones of the updated customization objects associated with a home page upon proper authentication of the mobile device; and generate a second response message to include other ones of the updated customization objects associated with a requested webpage upon receipt of a request for the requested webpage, the requested webpage being different than the home page.

18. The apparatus of claim 14, wherein, to generate the response message, the processor system is to:

generate the response message to include an instruction, the instruction to instruct the mobile device to store the updated customization objects upon receipt of the updated customization objects or upon display of the updated customization objects.

19. The apparatus of claim 14, wherein network interface is to:

obtain, from the mobile application via the mobile device, another request message, the other request message to request a webpage to be rendered in the mobile application; and send, to the mobile application via the mobile device, another response message, the other response message to include the requested webpage and at least one of the updated customization objects associated with the requested webpage when the processor system determines that the at least one the updated customization objects is associated with the requested webpage.

20. The apparatus of claim 14, wherein network interface is to:

obtain, from the mobile application via the mobile device, another request for another webpage to be rendered in the mobile application; and send, to the mobile device, another response message, the other response message to include the other webpage without any of the updated customization objects when the processor system determines that none of the updated customization objects are associated with the other webpage.

* * * * *